United States Patent
Yokota

(10) Patent No.: US 10,394,615 B2
(45) Date of Patent: Aug. 27, 2019

(54) INFORMATION PROCESSING APPARATUS AND JOB MANAGEMENT METHOD

(71) Applicant: FUJITSU LIMITED, Kawasaki-shi, Kanagawa (JP)

(72) Inventor: Hiroki Yokota, Numazu (JP)

(73) Assignee: FUJITSU LIMITED, Kawasaki (JP)

(*) Notice: Subject to any disclaimer, the term of this patent is extended or adjusted under 35 U.S.C. 154(b) by 81 days.

(21) Appl. No.: 15/428,503

(22) Filed: Feb. 9, 2017

(65) Prior Publication Data
US 2017/0329650 A1 Nov. 16, 2017

(30) Foreign Application Priority Data
May 10, 2016 (JP) .................................. 2016-094792

(51) Int. Cl.
*G06F 9/50* (2006.01)
*H04L 29/08* (2006.01)

(52) U.S. Cl.
CPC ............ *G06F 9/5088* (2013.01); *H04L 67/10* (2013.01)

(58) Field of Classification Search
CPC ........................................ G06F 9/45533–5094
See application file for complete search history.

(56) References Cited

U.S. PATENT DOCUMENTS

| | | | |
|---|---|---|---|
| 2007/0255836 A1 | 11/2007 | Takahashi et al. | |
| 2008/0294872 A1* | 11/2008 | Bryant | G06F 9/5027 712/28 |
| 2011/0265092 A1 | 10/2011 | Ohtani | |
| 2015/0277982 A1 | 10/2015 | Iwata | |
| 2015/0286506 A1* | 10/2015 | Hyser | G06F 9/45558 718/1 |
| 2015/0309842 A1* | 10/2015 | Wu | G06F 9/5027 718/104 |
| 2016/0070601 A1* | 3/2016 | Yamamoto | G06F 9/5088 718/105 |

FOREIGN PATENT DOCUMENTS

| | | |
|---|---|---|
| JP | 2007-293761 | 11/2007 |
| JP | 2011-227747 | 11/2011 |
| JP | 2015-194923 | 11/2015 |

OTHER PUBLICATIONS

Defragmentation for Efficient Runtime Resource Management in NoC-Based Many-Core Systems Jim Ng, Xiaohang Wang, Amit Kumar Singh Published: Apr. 20, 2016.*

(Continued)

*Primary Examiner* — Emerson C Puente
*Assistant Examiner* — Paul V Mills
(74) *Attorney, Agent, or Firm* — Fujitsu Patent Center

(57) ABSTRACT

An information processing apparatus takes each currently executing job as a candidate job, and when determining that a migration of a candidate job to a migration destination node selected from free nodes, which are not executing any jobs, is expected to expand a continued range of free nodes, specifies the migration as a possible migration. Then, on the basis of the amounts of communication needed to perform individual migrations based on a plurality of possible migrations and the numbers of nodes used for executing candidate jobs to be migrated in the individual possible migrations, the information processing apparatus determines a possible migration to be performed.

5 Claims, 13 Drawing Sheets

(56) References Cited

OTHER PUBLICATIONS

Architecture-Aware Graph Repartitioning for Data-Intensive Scientific Computing Angen Zheng, Alexandros Labrinidis, Panos K. Chrysanthis Published:2014.*

Entropy: a ConsolidationManager for Clusters Fabien Hermenier, Xavier Lorca, Jean-Marc Menaud, et al Published: 2009.*

Number Types Lesson Elizabeth Stapel Retrieved from: https://web.archive.org/web/20010305231828/https://www.purplemath.com/modules/numtypes.htm (Year: 2001).*

Microrant on Ruy's Math Skills Ruby-Forum Retrieved from: https://www.ruby-forum.com/t/microrant-on-ruys-math-skills/215983/47 (Year: 2012).*

Beginning Algebra v. 1.0 John Redden §1.1 Real Numbers and the Number Line (Year: 2012).*

"Microrant on Ruy's Math Skills" Ruby-Forum Retrieved from: https://www.ruby-forum.com/t/microrant-on-ruys-math-skills/215983/ (Year: 2012).*

\* cited by examiner

INFORMATION PROCESSING APPARATUS AND JOB MANAGEMENT METHOD

CROSS-REFERENCE TO RELATED APPLICATION

This application is based upon and claims the benefit of priority of the prior Japanese Patent Application No. 2016-094792, filed on May 10, 2016, the entire contents of which are incorporated herein by reference.

FIELD

The embodiments discussed herein relate to an information processing apparatus and a job management method.

BACKGROUND

When jobs are executed for prescribed operations in a computer system operating on a large-scale network or the like, the jobs are scheduled and are then assigned to resources (nodes).

In general, jobs are assigned on the basis of the amount of resources (the number of nodes, the memory capacities of the nodes, and others) that are needed to execute the jobs and time restrictions on when the jobs need to be completed.

For example, one of techniques related to the job assignment is that an agent which frequently communicates with an agent running on a node is moved to the node.

Further, for example, there is a technique in which an operating node is taken as an imaginary heat source, a lowest temperature free node among free nodes placed around the heat source is taken as a center node, and a node close to the center node is selected.

Still further, there is a technique of searching a plurality of nodes for free resources that are free during a time period between the current time and the scheduled start time of an already assigned job, and assigning a job to the found free resources.

Please see, for example, Japanese Laid-open Patent Publication Nos. 2007-293761, 2011-227747, and 2015-194923.

When a job is assigned to nodes, for example, as many free nodes as needed to execute the job are searched for. However, if free nodes and busy nodes executing other jobs exist (this state is called a fragmented state), communication between nodes may be unfeasible, and this may hold off on the assignment of the job to the free nodes.

To deal with this, in the case where the fragmented state occurs, jobs are migrated so that free nodes are placed together, and jobs are assigned to the free nodes in a region that has more free nodes as a result of the migration. In this connection, the migration is a technique in which a job executed by a node is moved to another node for the execution.

However, if the migration itself takes time to complete, the migration does not lead to an improvement in the overall operating rate of the system.

SUMMARY

According to one aspect, there is provided an information processing apparatus that includes a processor configured to perform a procedure including: taking currently executing jobs respectively as candidate jobs, and specifying, when a migration of a candidate job to a migration destination node selected from free nodes, which are not executing any jobs, is expected to expand a continued range of free nodes, the migration of the candidate job to the migration destination node as a possible migration; and determining, when a plurality of possible migrations is specified, a possible migration to be performed from among the plurality of possible migrations, based on amounts of communication needed to perform individual migrations indicated by the plurality of possible migrations and numbers of nodes used for executing candidate jobs to be migrated in the individual migrations.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
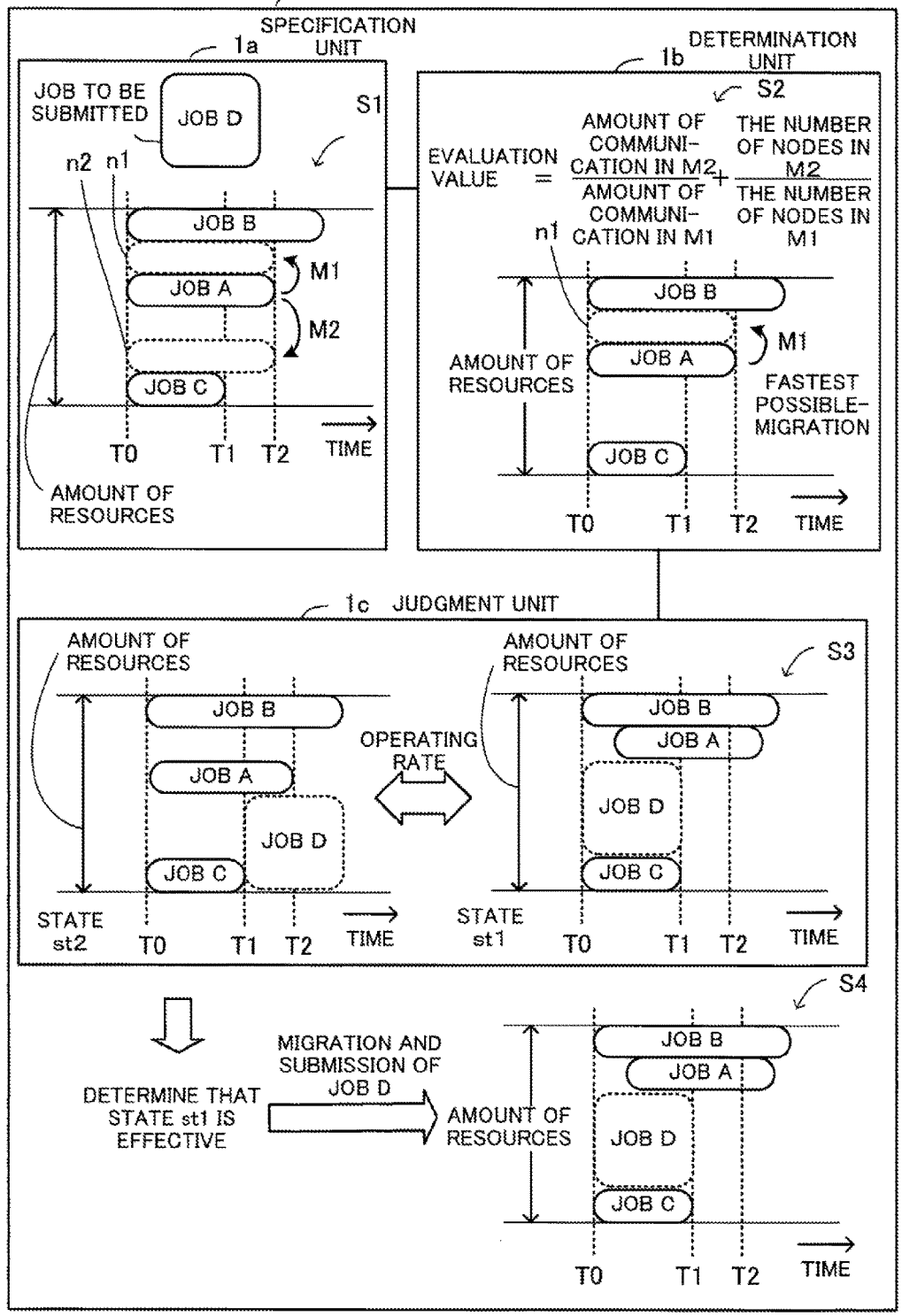
FIG. 1 illustrates an example of functions of an information processing apparatus according to the first embodiment.

Several embodiments will be described below with reference to the accompanying drawings, wherein like reference numerals refer to like elements throughout. It is noted that one or more of the embodiments may be combined as long as the combined embodiments are not mutually exclusive.

First Embodiment

A first embodiment will be described. FIG. 1 illustrates an example of functions of an information processing apparatus according to the first embodiment. An information processing apparatus 1 manages jobs to be executed by a plurality of nodes connected over a direct network. The direct network interconnects a plurality of nodes via their built-in routers. The direct network may be a mesh interconnection network, a torus interconnection network, or another.

In addition, the information processing apparatus 1 has a function of migrating a job currently executing on a node, from the node to another. The information processing apparatus 1 includes a specification unit 1a, a determination unit 1b, and a judgment unit 1c. These specification unit 1a, determination unit 1b, and judgment unit 1c are functions that are implemented by causing a processor provided in the information processing apparatus 1 to execute programs describing processes corresponding to these units.

The specification unit 1a specifies possible migrations (M1, M2). For example, the specification unit 1a takes each currently executing job as a candidate job. Then, the specification unit 1a determines whether a migration of a candidate job to a migration destination node selected from among free nodes, which are not executing any jobs, is expected to expand a continued range of free nodes. If it is determined that the range is expected to expand, the specification unit 1a specifies the migration of the candidate job to the migration destination node as a possible migration (M1, M2). For one job to be migrated, there may be a plurality of possible migrations (M1, M2) with different migration destination nodes.

In this connection, the specification unit 1a may be designed to specify a migration of a candidate job to a migration destination node as a possible migration (M1, M2) only when the migration is expected to expand a continued range of free nodes to the point where a new job is executable. For example, in the case of a torus interconnection network, a job is assigned to nodes such that communication is efficiently performed between the nodes that are to execute the job. In the case of a parallel job, which is performed in parallel by a plurality of nodes, the job is assigned to and executed by a group of adjacent nodes. In the case of a two-dimensional torus network, a job is executed by nodes existing within a rectangular region. In the case of a three-dimensional torus network, a job is executed by nodes existing within a cuboid region. That is, when determining that a migration of a currently executing job creates a rectangular or cuboid region including as many free nodes as the number of nodes used to execute a new job, the specification unit 1a takes the migration as a possible migration (M1, M2).

If a plurality of possible migrations (M1, M2) is specified, the determination unit 1b determines a possible migration with the shortest migration time from among the plurality of possible migrations (M1, M2), as a possible migration to be performed. For example, with respect to each of the plurality of possible migrations (M1, M2), the determination unit 1b calculates the amount of communication needed to perform the migration indicated by the possible migration (M1, M2) and the number of nodes used to execute the candidate job migrated by the migration. The determination unit 1b then determines the possible migration (M1) to be performed, on the basis of the amounts of communication and the numbers of nodes for the individual possible migrations.

For example, the determination unit 1b repeatedly extracts two possible migrations that have not been excluded from comparisons, from the plurality of possible migrations, as a pair of possible migrations. Each time a pair of possible migrations is generated, the determination unit 1b calculates an evaluation value that is used for making a comparison in terms of the time taken for a job migration, on the basis of the amounts of communication and the numbers of nodes calculated for the individual paired possible migrations. For example, the evaluation value is the sum of the ratio regarding the amount of communication and the ratio regarding the number of nodes. With respect to the generated pair of possible migrations, the determination unit 1b excludes, from comparisons, one possible migration that is evaluated to take a longer time for the job migration than the other possible migration on the basis of the evaluation value.

Then, the determination unit 1b determines a possible migration that finally remains, without being excluded from comparisons, as a possible migration (M1) to be performed.

The judgment unit 1c judges the effectiveness of the execution of the migration indicated by the possible migration to be performed. For example, the judgment unit 1c calculates a reduced operating rate and an improved operating rate that result from the migration based on the possible migration (M1) to be performed. The reduced operating rate indicates how much the migration decreases the execution efficiency of candidate jobs. The improved operating rate indicates how much the migration increases the execution efficiency of jobs other than the candidate jobs. If the reduced operating rate is smaller than the improved operating rate, the judgment unit 1c determines that the execution of the migration based on the possible migration to be performed is effective.

The following describes a processing flow with reference to a concrete example illustrated in FIG. 1.

(Step S1) From before time T0, jobs A, B, and C are assigned to nodes and are executed. In addition, free nodes n1 and n2, which are not assigned the jobs A, B, and C, are scattered. It is assumed that, under this state, the job A is migrated at time T0 in order to allow a job D to be submitted.

In this case, the specification unit 1a specifies a possible migration M1 that is a migration of the job A to the free node n1 and a possible migration M2 that is a migration of the job A to the free node n2.

(Step S2) The determination unit 1b evaluates which of the possible migrations M1 and M2 achieves a shorter migration time, on the basis of the evaluation value. In this example, if the possible migration M1 is evaluated to take a shorter migration time than the possible migration M2, the determination unit 1b determines the possible migration M1 as a possible migration to be performed.

(Step S3) The judgment unit 1c determines whether the operating rate is improved or not by performing the migration based on the possible migration having the shortest migration time determined by the determination unit 1b, in order to determine the effectiveness of the execution of the migration.

It is now assumed that a state st1 is a state where the job A is migrated to the free node n1 and the job D is submitted to a free node n3 in a newly created region and is executed. It is also assumed that a state st2 is a state where no migration is performed but a job D is submitted when a sufficient number of nodes become free. The judgment unit 1c determines whether the state st1 is effective in improving the operating rate, based on whether the state st1 improves the operating rate more than the state st2. In this example, it is assumed that the migration based on the possible migration M1 with the shortest migration time improves the operating rate.

(Step S4) The job A is migrated to the free node n1 by performing the possible migration M1, and the job D is submitted to the node n3 that has become free as a result of the migration.

In this connection, if the judgment unit 1c determines that the migration based on the possible migration M1 with the shortest migration time does not improve the operating rate, for example, the job A is not migrated, but the job D is executed at the scheduled end time T1 of the job C as in the state st2.

As described above, the information processing apparatus 1 determines a possible migration with the shortest migration time on the basis of the evaluation value from among the possible migrations, and judges the effectiveness of the execution of the migration based on the determined possible migration. This approach makes it possible to perform only an effective migration with the shortest migration time, which results in an improvement in the operating rate.

In this connection, FIG. 1 illustrates only two possible migrations by way of example. However, there may be three or more possible migrations. In this case, for example, the determination unit 1*b* repeatedly extracts two possible migrations that have not been excluded from comparisons, from among the plurality of possible migrations, as a pair of possible migrations. Each time a pair of possible migrations is generated, the determination unit 1*b* calculates an evaluation value that is used for making a comparison in terms of the time taken for a job migration, on the basis of the amounts of communication and the numbers of nodes that are needed for the individual paired possible migrations. Then, with respect to the generated pair of possible migrations, the determination unit 1*b* excludes, from comparisons, one possible migration which is evaluated to take a longer time for the job migration than the other possible migration on the basis of the evaluation value. Then, the determination unit 1*b* determines a possible migration that finally remains, without being excluded from comparisons, as a possible migration (M1) to be performed. This approach makes it possible to easily determine a possible migration to be performed, even in the case where there are many possible migrations.

Second Embodiment

A second embodiment will be described. This second embodiment is designed to efficiently perform a migration such as to reduce the time taken for the migration, in scheduling jobs in a torus network, mesh network, or another where a plurality of nodes is interconnected.

In this connection, the torus network interconnects nodes in a torus structure, and is formed in a two-dimensional or three-dimensional topology.

Figure 2:
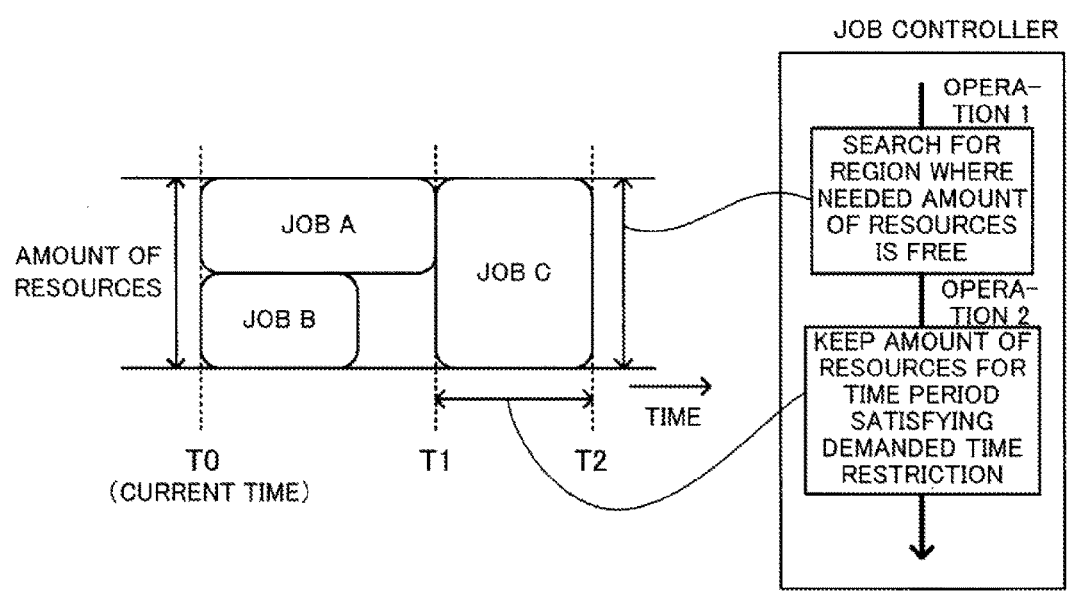
FIG. 2 is a view for explaining job scheduling.

FIG. 2 is a view for explaining job scheduling. A job controller that schedules a job assigns the job to resources on the basis of an amount of resources and a demanded time restriction.

(Operation 1) The job controller investigates the amount of free resources that are usable for executing the job. For example, the job controller finds the amount of free resources that are usable for the submitted job, with reference to a database that manages the amount of resources for executing each job.

(Operation 2) The job controller confirms a scheduled end time of currently executing jobs. The job controller then keeps the amount of free resources from the confirmed scheduled end time for a time period satisfying a demanded time restriction, i.e., for a time period from the start to the end of the submitted job.

In the example of FIG. 2, when a job C is submitted while jobs A and B are executing, the job controller searches for a region where there are free resources available for executing the job C.

In addition, the job controller confirms that the scheduled end time of the job A is time T1, and keeps (uses) the amount of resources for a time period satisfying the demanded time restriction, i.e., for a time period from the start time T1 to the end time T2 of the job C.

In this connection, regarding the amount of resources, if one node is sufficient to execute the job C, a single node is kept for the job C. If a plurality of nodes is needed to execute the job C, a plurality of nodes is kept for the job C.

When a job is assigned to nodes over a network, for example, as many free nodes as the number of nodes needed to execute the job are searched for. However, if a fragmented state where free nodes and busy nodes exist together occurs, communication between nodes may be unfeasible, and this may hold off on the assignment of the job to the free nodes.

Figure 3:
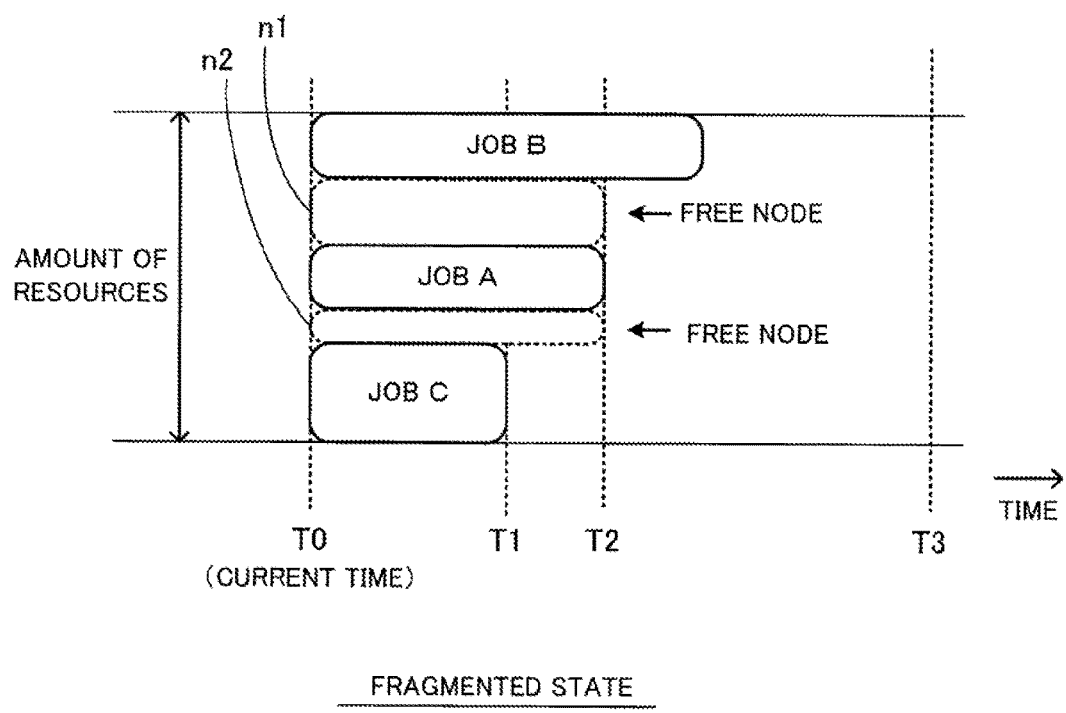
FIG. 3 illustrates an example of a fragmented state.

FIG. 3 illustrates an example of a fragmented state. In the case where a fixed amount of resources are provided for assignment and execution of jobs, resources having no jobs assigned thereto may be scattered. This phenomenon is called a fragmentation.

Referring to the example of FIG. 3, jobs A, B, and C are assigned to nodes and start to execute at the current time T0. Free nodes (referred to as free nodes n1 and n2) to which the jobs A, B, and C are not assigned are scattered, and therefore a fragmented state occurs.

Figure 4:
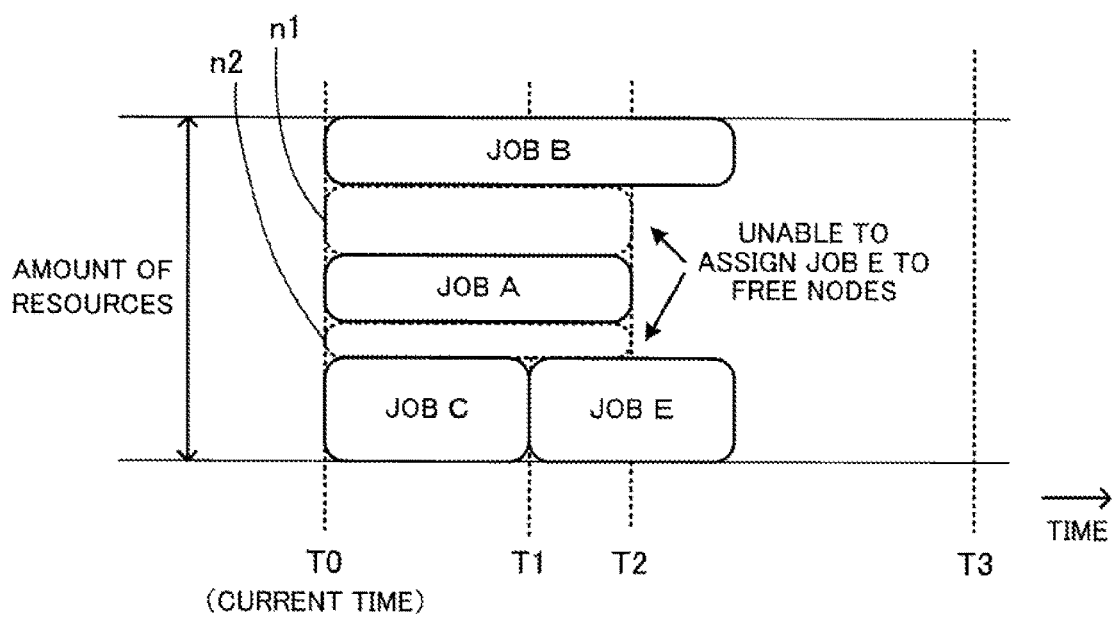
FIG. 4 illustrates an example of job assignment in the fragmented state.

FIG. 4 illustrates an example of job assignment in the fragmented state. It is assumed that a job E is submitted for execution in a fragmented state but the amount of resources available in each free node n1, n2 is insufficient to execute the job E.

In this case, the job E is not assignable to the free node n1 or the free node n2.

To execute the job E at the earliest in the fragmented state of FIG. 3, nodes that are free after time T1, which is the scheduled end time of the job C, are used to execute the job E as illustrated in FIG. 4.

As described above, in the fragmented state, a job may be unassignable to scattered free nodes. If the job is not assignable to free nodes, the execution start time of the job is delayed.

To solve such a problem caused in the fragmented state, it may be considered to migrate a job so that free nodes are placed together.

Figure 5:
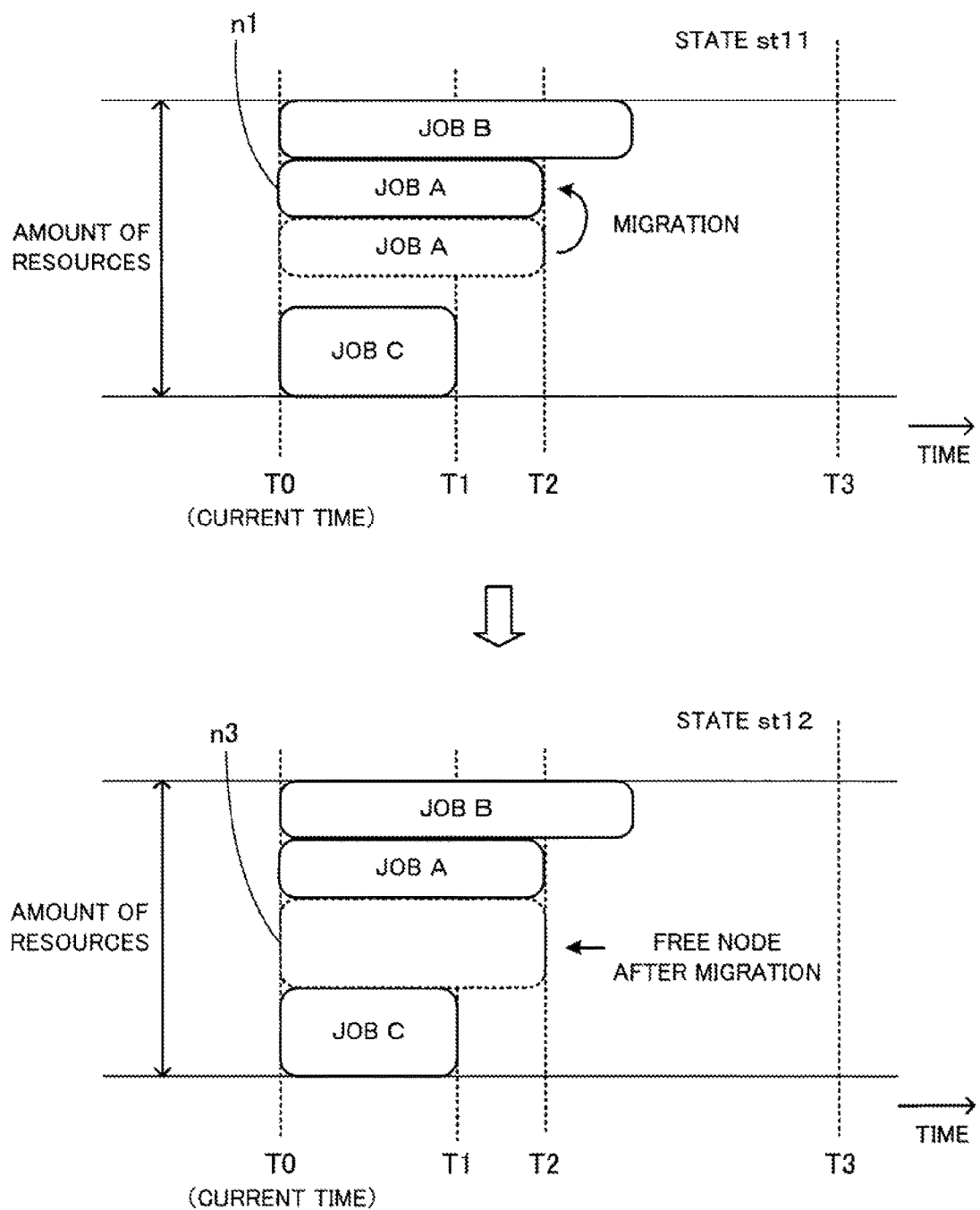
FIG. 5 illustrates an example of a migration.

FIG. 5 illustrates an example of a migration. A state st11 represents that a migration of the job A from the executing node to a free node n1 is performed. A state st12 represents that a node n3 becomes free as a result of the migration.

Figure 6:
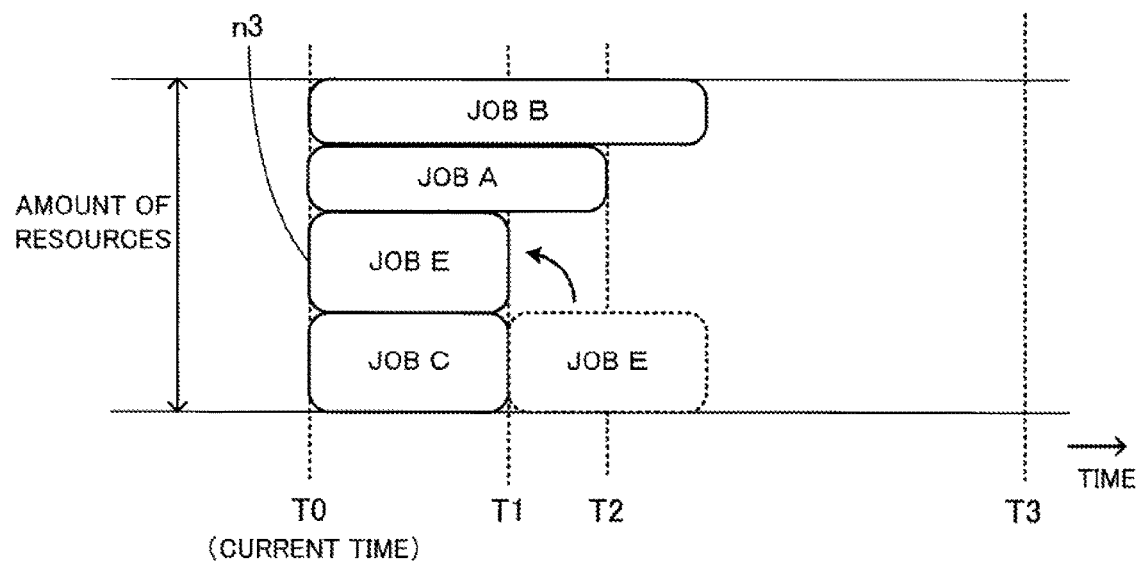
FIG. 6 illustrates an example of assigning a job after the migration.

FIG. 6 illustrates an example of assigning a job after the migration. The migration illustrated in FIG. 5 results in causing the migration destination node n1 to execute the job A. In addition, the node n3 that has the amount of resources needed to execute the job E is made free. Therefore, the job E is assignable to the node n3, thereby making it possible to execute the job E at time T0 earlier than time T1.

As described above, even in a fragmented state where free nodes are scattered, it is possible that free nodes are placed together by a migration, and the job is assignable to the free nodes in a region that has more free nodes as a result of the migration.

However, a conventional migration technique takes time for a migration itself, including a process of determining a possible migration, i.e., determining which nodes of a plurality of free nodes a job is to be migrated to. Therefore, the operating rate does not improve as a whole, and may even decrease.

In contrast, the second embodiment appropriately evaluates the time taken for a migration, finds a possible migration that achieves the shortest migration time, and judges the effectiveness of the execution of the migration based on the determined possible migration. This makes it possible to reduce the time taken for the migration and improve the operating rate.

Figure 7:
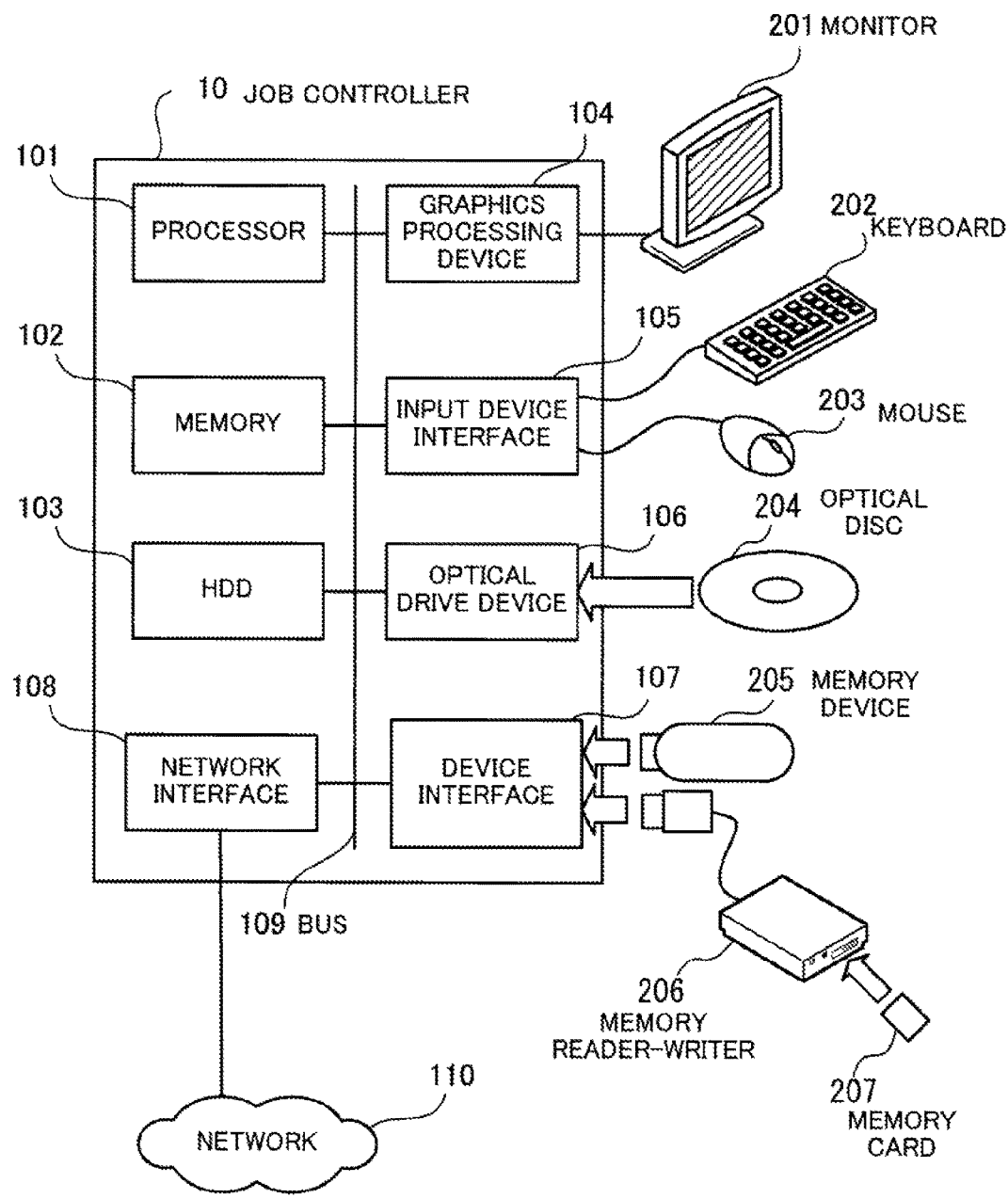
FIG. 7 illustrates an example of a hardware configuration of a job controller used in the second embodiment.

FIG. 7 illustrates an example of a hardware configuration of a job controller used in the second embodiment. A job controller 10 is entirely controlled by a processor 101. A memory 102 and a plurality of peripheral devices are connected to the processor 101 via a bus 109. The processor 101 may be a multiprocessor.

The processor 101 is, for example, a Central Processing Unit (CPU), a Micro Processing Unit (MPU), or a Digital Signal Processor (DSP). At least part of functions of the processor 101 may be implemented by using an Application Specific Integrated Circuit (ASIC), a Programmable Logic Device (PLD), or other electronic circuits.

The memory 102 is used as a main storage device of the job controller 10. The memory 102 temporarily stores therein at least part of Operating System (OS) programs and application programs to be executed by the processor 101. Also, the memory 102 stores therein a variety of data that is used by the processor 101 in processing. As the memory 102, a volatile semiconductor storage device, such as a Random Access Memory (RAM), may be used, for example.

The peripheral devices connected to the bus 109 include a Hard Disk Drive (HDD) 103, a graphics processing device 104, an input device interface 105, an optical drive device 106, a device interface 107, and a network interface 108.

The HDD 103 electrically or magnetically reads and writes data on a built-in storage medium. The HDD 103 is used as an auxiliary storage device of the job controller 10. The HDD 103 stores therein OS programs, application programs, and a variety of data. In this connection, as the auxiliary storage device, a flash memory or another non-volatile semiconductor storage device may be used.

A monitor 201 is connected to the graphics processing device 104. The graphics processing device 104 displays images on the display of the monitor 201 in accordance with instructions from the processor 101. As the monitor 201, a display device using a Cathode Ray Tube (CRT) display or a liquid crystal display device may be used.

A keyboard 202 and a mouse 203 are connected to the input device interface 105. The input device interface 105 outputs signals received from the keyboard 202 and mouse 203 to the processor 101.

In this connection, the mouse 203 is one example of pointing devices, and another pointing device may be used. Other pointing devices include touch panels, tablets, touchpads, and trackballs.

The optical drive device 106 reads data from an optical disc 204 with laser light or the like. The optical disc 204 is a portable recording medium on which data is recorded such as to be readable with reflection of light. The optical disc 204 may be a Digital Versatile Disc (DVD), DVD-RAM, CD-ROM (Compact Disc Read Only Memory), CD-R (Recordable), CD-RW (ReWritable), or another.

The device interface 107 is a communication interface that allows peripheral devices to be connected to the job controller 10. For example, a memory device 205 or a memory reader-writer 206 may be connected to the device interface 107. The memory device 205 is a recording medium having a function of communicating with the device interface 107. The memory reader-writer 206 reads or writes data on a memory card 207, which is a card-type recording medium.

The network interface 108 is connected to a network 110. The network interface 108 communicates data with another computer or communication device over the network 110.

With the above hardware configuration, the processing functions of the second embodiment are implemented. In this connection, the information processing apparatus 1 of the first embodiment may be implemented by using the same hardware as the job controller 10 of FIG. 7.

The job controller 10 implements the processing functions of the second embodiment by executing a program recorded in a computer-readable recording medium, for example. The program describing the processing content to be executed by the job controller 10 may be recorded on a variety of recording media.

For example, the program to be executed by the job controller 10 may be stored on the HDD 103. The processor 101 loads at least part of the program from the HDD 103 to the memory 102 and then executes the program. Alternatively, the program to be executed by the job controller 10 may be recorded on the optical disc 204, memory device 205, memory card 207, or another portable recording medium.

The program stored in such a portable recording medium becomes executable after being installed on the HDD 103 under the control of the processor 101, for example. Alternatively, the processor 101 may execute the program directly read from a portable recording medium.

Figure 8:
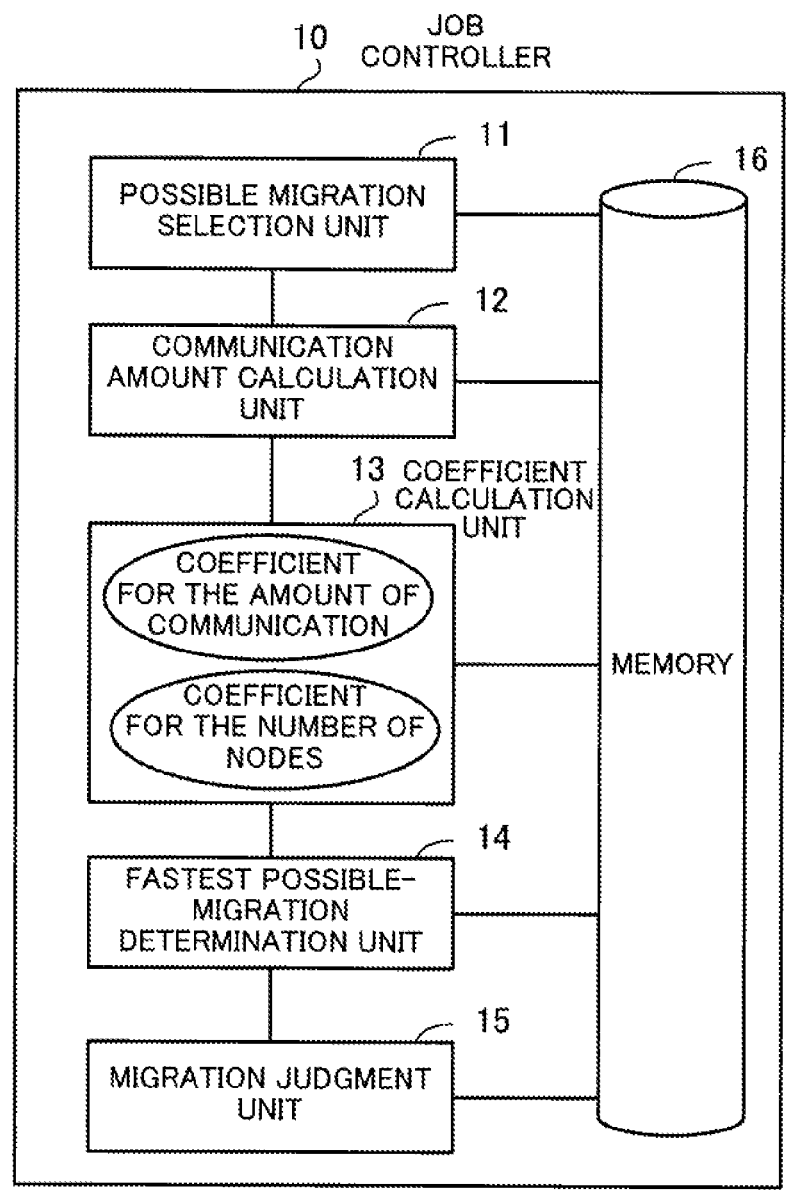
FIG. 8 is a block diagram illustrating an example of functions of the job controller used in the second embodiment.

FIG. 8 is a block diagram illustrating an example of functions of the job controller used in the second embodiment. The job controller 10 includes a possible migration selection unit 11, a communication amount calculation unit 12, a coefficient calculation unit 13, a fastest possible-migration determination unit 14, a migration judgment unit 15, and a memory 16.

The functions of these constitutional units are implemented by the processor 101 illustrated in FIG. 7. The memory 16 corresponds to the memory 102 and HDD 103 illustrated in FIG. 7. Each constitutional unit may be configured with hardware circuitry, such as logical circuits.

In addition, the functions of the specification unit 1a and determination unit 1b illustrated in FIG. 1 are implemented by the possible migration selection unit 11, communication amount calculation unit 12, coefficient calculation unit 13, and fastest possible-migration determination unit 14, and the functions of the judgment unit 1c illustrated in FIG. 1 are implemented by the migration judgment unit 15.

The possible migration selection unit 11 selects possible migrations for migrating jobs when a fragmented state occurs or at another occasion. The communication amount calculation unit 12 calculates the amount of communication needed to migrate the jobs involved in the selected possible migration.

The coefficient calculation unit 13 calculates a ratio regarding the amount of communication between possible migrations as a coefficient for the amount of communication. In addition, the coefficient calculation unit 13 calculates a ratio regarding the number of nodes used by jobs between the possible migrations as a coefficient for the number of nodes.

The fastest possible-migration determination unit 14 determines a fastest possible-migration with the shortest migration time from among a plurality of possible migrations on the basis of the coefficient for the amount of communication or the value calculated by adding the coefficient for the amount of communication and the coefficient for the number of nodes.

The migration judgment unit 15 determines whether the migration based on the fastest possible-migration determined by the fastest possible-migration determination unit 14 actually improves the operating rate.

The memory 16 holds a variety of parameters used by the constitutional units, information used by the job controller 10 to exercise the overall control, and others. In addition, the memory 16 holds, for each job, a CPU performance (operational frequency) needed to execute the job, a memory restriction value (a restriction value on an amount of memory needed to execute the job), and others. In addition, the memory 16 holds a time map as described below.

Figure 9:
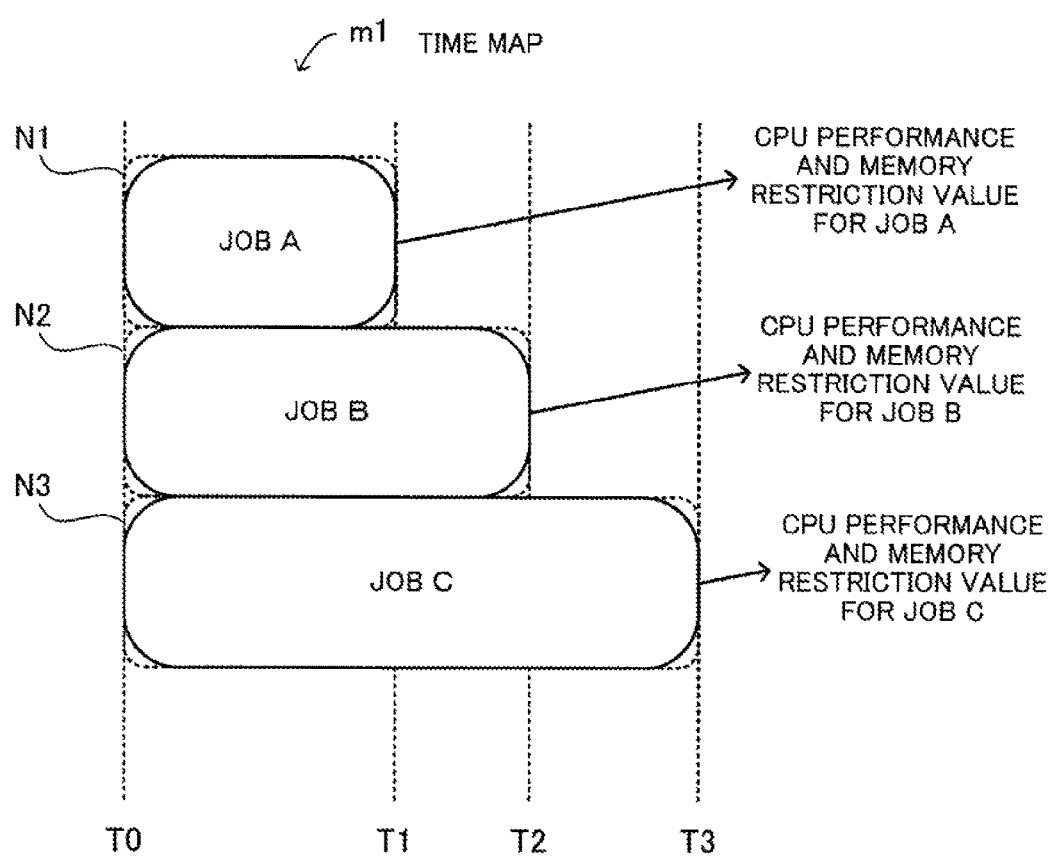
FIG. 9 illustrates an example of a time map.

FIG. 9 illustrates an example of a time map. A time map m1 represents information indicating which nodes jobs are assigned to for each time point. In this example, the time map indicates that at time T0, a job A is assigned to a node N1, a job B is assigned to a node N2, a job C is assigned to a node N3, and the jobs A to C start to be executed by the nodes N1 to N3.

In addition, at time T1, the execution of the job A assigned to the node N1 ends, and the job B assigned to the node N2 and the job C assigned to the node N3 are under execution.

At time T2, the execution of the job B assigned to the node N2 ends, and the job C assigned to the node N3 is under execution.

At time T3, the execution of the job C assigned to the node N3 ends.

As described above, information indicating which nodes jobs are assigned to for each time point is stored and managed using the time map m1. This makes it possible to easily recognize information about the assignment of jobs. In addition, it is possible to obtain the CPU performance and memory restriction value for each of the jobs A, B, and C to be executed.

The following describes in detail an operation of the job controller 10 to determine a possible migration with the shortest migration time from among a plurality of possible migrations.

(Communication Amount Calculation Process)

First, a communication amount calculation process will be described. A migration of a job to a free node involves communication whose amount corresponds to the data of the job.

Therefore, when a possible migration (referred to as a possible migration Ma) is selected, the communication amount calculation unit 12 calculates the amount of communication (the amount of communication in the possible migration Ma) needed to perform the migration based on the possible migration Ma.

In this case, the communication amount calculation unit 12 first calculates the amount of communication for each job to be migrated in the possible migration Ma. The amount of communication for each job is calculated with the following equation (1).

(Amount of communication for each job)=(The number of communication hops)×(Amount of memory)  (1)

In this connection, "the number of communication hops" in the equation (1) is the number of node hops between a migration source node and a migration destination node of a job to be migrated.

The memory 16 holds information indicating which nodes jobs are assigned to. Therefore, the communication amount calculation unit 12 is able to calculate the number of communication hops starting with the location (coordinates) of an assigned job on the basis of the held information.

For example, in the case of the three-dimensional coordinates, the number of communication hops is calculated with the following equation (2).

(The number of communication hops)={(x coordinate of migration destination node)−(x coordinate of migration source node)}+{(y coordinate of migration destination node)−(y coordinate of migration source node)}+{(z coordinate of migration destination node)−(z coordinate of migration source node)}  (2)

On the other hand, the "amount of memory" in the equation (1) corresponds to a memory restriction value indicating how much the memory is usable for executing a job.

In this connection, to obtain the amount of memory usage needed to execute a job, the amount of memory currently used by a node actually executing the job needs to be obtained. However, this takes time. Therefore, the restriction value on an amount of memory is used.

The job controller 10 assigns a job within an allowable amount of the memory installed in a node. For this purpose, a memory restriction value indicating how much amount of memory is usable for the job is held in the memory 16. Therefore, the communication amount calculation unit 12 is able to immediately obtain the memory restriction value, that is, the "amount of memory" used for calculating the amount of communication.

As described above, the communication amount calculation unit 12 calculates the amount of communication for each job with the equation (1). Then, the communication amount calculation unit 12 calculates the total amount of communication for all jobs to be migrated in the possible migration Ma, and takes the total as the amount of communication in the possible migration Ma.

Note that, in the case of making a comparison of the amount of communication between two possible migrations, a possible migration that needs a smaller amount of communication is more advantageous in terms of time reduction because a possible migration that needs a larger amount of communication causes more communication through a communication path. Therefore, in view of the time reduction, a smaller number of communication hops is desirable, and a smaller amount of memory used for executing jobs is desirable.

(Coefficient Calculation Process)

The following describes a coefficient calculation process. The coefficient calculation unit 13 calculates a ratio (a coefficient for the amount of communication) between the amount of communication in the possible migration Ma and the amount of communication in a possible migration (referred to as a possible migration Mb) to be compared with the possible migration Ma.

In this connection, the amount of communication in the possible migration Ma corresponds to a first amount of communication, and the amount of communication in the possible migration Mb corresponds to a second amount of communication. The coefficient for the amount of communication is calculated with the following equation (3).

(Coefficient for amount of communication)=(Amount of communication in possible migration Mb)/(Amount of communication in possible migration Ma)  (3)

In addition, the coefficient calculation unit 13 calculates a ratio (a coefficient for the number of nodes) between the number of nodes used by jobs in the possible migration Ma and the number of nodes used by jobs in the possible migration Mb.

In this connection, the number of nodes used by jobs in the possible migration Ma corresponds to a first number of nodes, and the number of nodes used by jobs in the possible migration Mb corresponds to a second number of nodes. The coefficient for the number of nodes is calculated with the following equation (4).

(Coefficient for the number of nodes)=(The number of nodes used by jobs in the possible migration Mb)/(The number of nodes used by jobs in the possible migration Ma)  (4)

With respect to the number of nodes used by jobs in a possible migration, the job controller 10 stores, in the memory 16, information indicating which jobs are assigned to which nodes, when assigning the jobs. Therefore, the coefficient calculation unit 13 is able to immediately obtain the number of nodes when calculating the coefficient for the number of nodes. In this connection, a migration of more nodes takes more time.

(Fastest Possible-Migration Determination Process)

The following describes a process of determining a fastest possible-migration. An amount of communication has the greatest influence on the processing time for a migration. Therefore, the fastest possible-migration determination unit 14 compares two possible migrations on the basis of the coefficient for an amount of communication to determine which possible migration is more advantageous in terms of reducing a processing time.

Then, if the comparison based only on the coefficient for the amount of communication does not lead to determining a fastest possible-migration, which is advantageous in terms of reducing a processing time, the coefficient for the number of nodes is also used to determine a fastest possible-migration. More specifically, the fastest possible-migration determination unit 14 calculates a final evaluation value by adding the coefficient for the amount of communication and the coefficient for the number of nodes, and compares the final evaluation value with a prescribed value, to thereby determine a fastest possible-migration. In this connection, the final evaluation value is calculated with the following equation (5).

(Final evaluation value)=(Coefficient for amount of communication)+(Coefficient for the number of nodes)={(Amount of communication in possible migration $Mb$)/(Amount of communication in possible migration $Ma$)}+{(the number of nodes used by jobs in possible migration $Mb$)/(the number of nodes used by jobs in possible migration $Ma$)}     (5)

Figure 10:
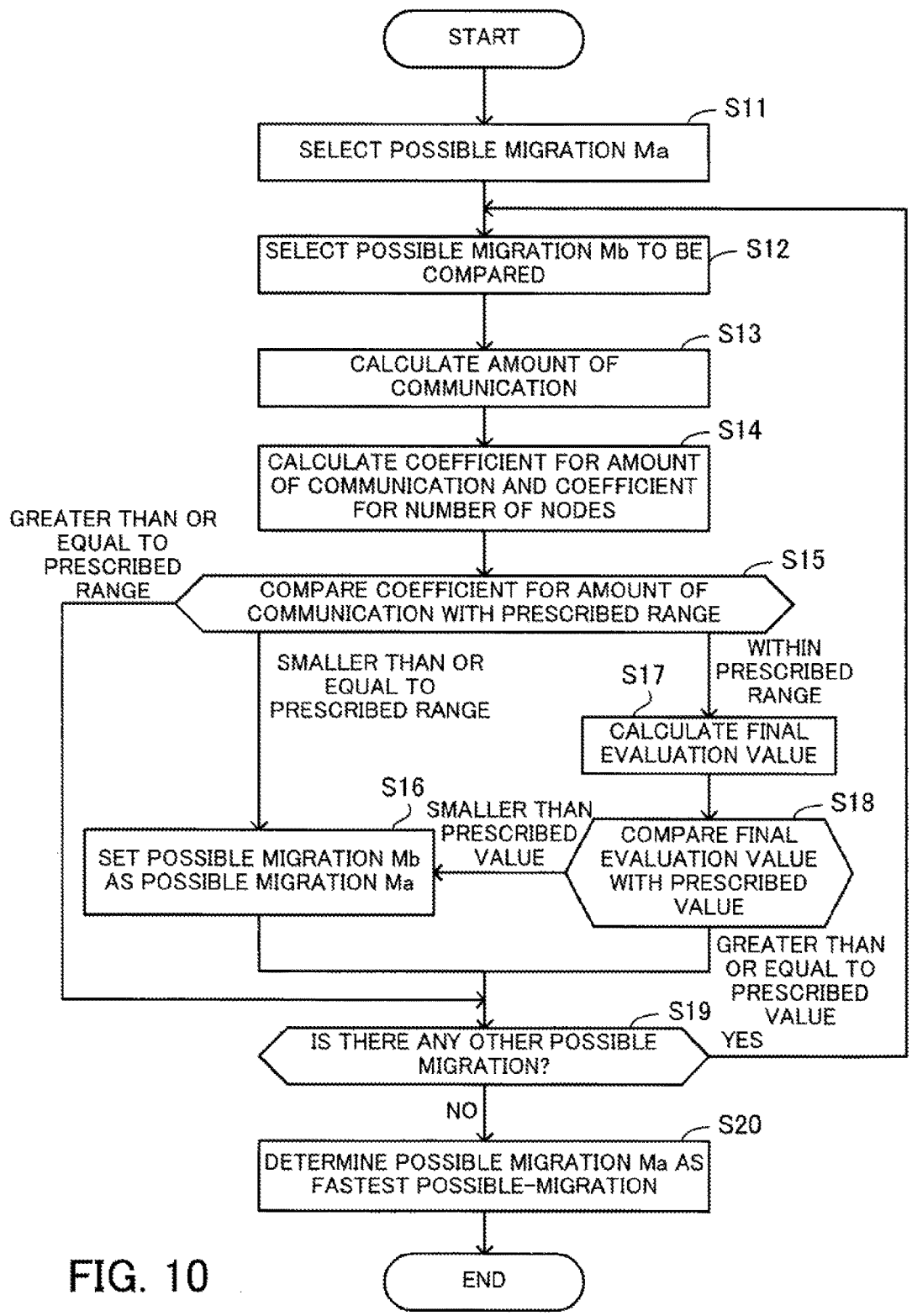
FIG. 10 is a flowchart illustrating an example of an operation to determine a fastest possible-migration.

FIG. 10 is a flowchart illustrating an example of an operation to determine a fastest possible-migration.

(Step S11) The possible migration selection unit 11 selects a possible migration Ma.

(Step S12) The possible migration selection unit 11 selects a possible migration Mb to be compared with the possible migration Ma. These possible migrations Ma and Mb are taken as a pair of possible migrations to be compared with each other. In this connection, possible migrations that have previously been selected and excluded from comparisons are not selected at step S12.

(Step S13) The communication amount calculation unit 12 calculates the amount of communication for each of the selected possible migrations with the above equation (1).

(Step S14) The coefficient calculation unit 13 calculates a coefficient for the amount of communication with the equation (3), and calculates a coefficient for the number of nodes with the equation (4).

(Step S15) The fastest possible-migration determination unit 14 compares the coefficient for the amount of communication (first evaluation value) with a prescribed range (first evaluation). If the coefficient for the amount of communication is smaller than or equal to the lower limit (for example, 0.9) of the prescribed range, the possible migration Mb is excluded from later comparisons, and the process proceeds to step S16. If the coefficient for the amount of communication is greater than or equal to the upper limit (for example, 1.1) of the prescribed range, the possible migration Mb is excluded from later comparisons, and the process proceeds to step S19. If the coefficient for the amount of communication is within the prescribed range (for example, 0.9<the coefficient for the amount of communication<1.1), the process proceeds to step S17.

(Step S16) Since the coefficient for the amount of communication is smaller than or equal to the lower limit of the prescribed range, the fastest possible-migration determination unit 14 tentatively sets the possible migration Mb as the possible migration Ma.

(Step S17) Since the coefficient for the amount of communication is within the prescribed range, the fastest possible-migration determination unit 14 calculates a final evaluation value with the equation (5).

(Step S18) The fastest possible-migration determination unit 14 compares the final evaluation value (second evaluation value) with a prescribed value (second evaluation). If the final evaluation value is smaller than the prescribed value (for example, smaller than 2), the process proceeds to step S16. If the final evaluation value is greater than or equal to the prescribed value (for example, greater than or equal to 2), the process proceeds to step S19.

(Step S19) The fastest possible-migration determination unit 14 determines whether there is any other possible migration. If another possible migration exists, the process proceeds back to step S12. If there is no other possible migration, the process proceeds to step S20.

(Step S20) The fastest possible-migration determination unit 14 determines the possible migration Ma as a fastest possible-migration.

As described above, the fastest possible-migration determination unit 14 first carries out the first evaluation to determine a fastest possible-migration on the basis of the first evaluation value (a coefficient for the amount of communication) including a parameter for the amount of communication.

It is now assumed that the first evaluation value does not satisfy a criterion for determining a fastest possible-migration (that is, the first evaluation value is within the prescribed range). In this case, the fastest possible-migration determination unit 14 carries out the second evaluation to determine a fastest possible-migration on the basis of the second evaluation value (final evaluation value) including a parameter for the number of nodes and the parameter for the amount of communication.

The above approach makes it possible to determine a fastest possible-migration with the shortest migration time from among a plurality of possible migrations efficiently and at a high speed.

(Migration Judgment Process)

The following describes a migration judgment process. The migration judgment unit 15 determines whether a migration based on a fastest possible-migration determined as described above actually improves an operating rate.

If it is determined that an improvement in the operating rate is expected, the migration based on the determined fastest possible-migration is performed. If it is determined that an improvement in the operating rate is not expected, the migration based on the determined fastest possible-migration is not performed.

The migration judgment unit 15 calculates an operating rate (reduced operating rate) reduced as a result of the migration based on the fastest possible-migration, with the following equation (6).

(Reduced operating rate)=(Migration time)×(The number of nodes)     (6)

In this connection, the "migration time" is calculated with the following equation (7).

(Migration time)=(Time taken to write job data in file)×(Amount of memory usage)/(Width of band)  (7)

The "time taken to write job data in file" in the equation (7) is a processing time for writing job data to be moved in the migration, in a file, and is a fixed value. The "amount of memory usage" is an amount of memory usage in a node used for the migration. The band width is the band width of a communication path connected to the node used for the migration.

In addition, if the migration judgment unit 15 determines that the reduced operating rate calculated with the equation (6) is smaller than an operating rate (improved operating rate) indicating an improvement in utilization as a result of the migration, the migration judgment unit 15 determines that the migration is effective in improving the operating rate. In this connection, the improved operating rate is calculated with the following equation (8).

(Improved operating rate)={(Scheduled execution time point in the case where migration is not performed)−(Scheduled execution time point in the case where migration is performed)}×(The number of nodes)  (8)

As described above, the migration judgment unit calculates the reduced operating rate and the improved operating rate that result from a migration based on a fastest possible-migration, and if the reduced operating rate is smaller than the improved operating rate, determines that the execution of the migration based on the fastest possible-migration is effective.

By the way, in the case where a job is submitted for execution in a fragmented state, the execution of the submitted job at a scheduled end time of a currently executing job without migration may improve the operating rate, rather than the execution of the submitted job after a migration is performed.

Therefore, to deal with such a situation, the migration judgment unit 15 judges the effectiveness of the execution of a fastest possible-migration. This makes it possible to assign jobs such as to improve the operating rate the best.

Figure 11:
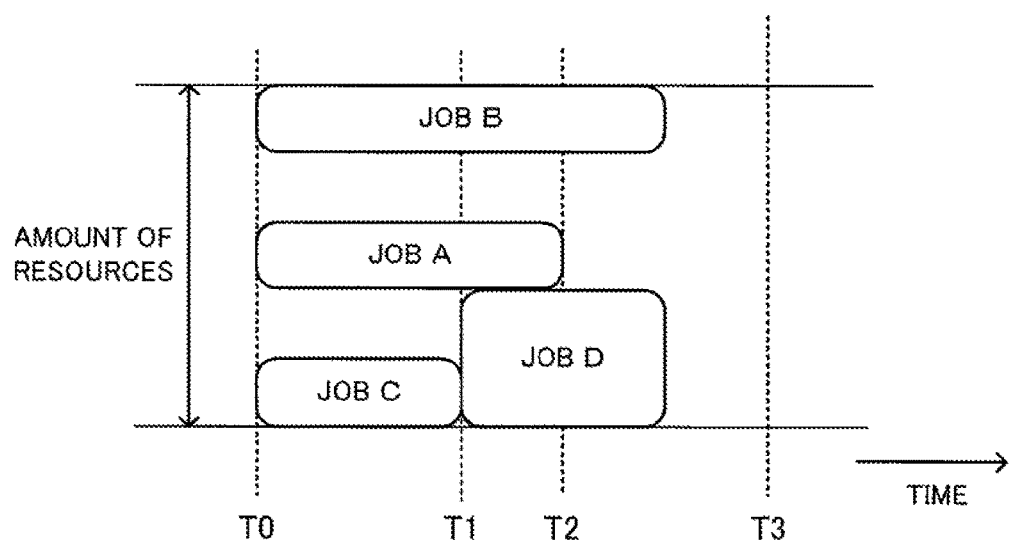
FIG. 11 illustrates an example of submitting a job in a fragmented state.
Figure 12:
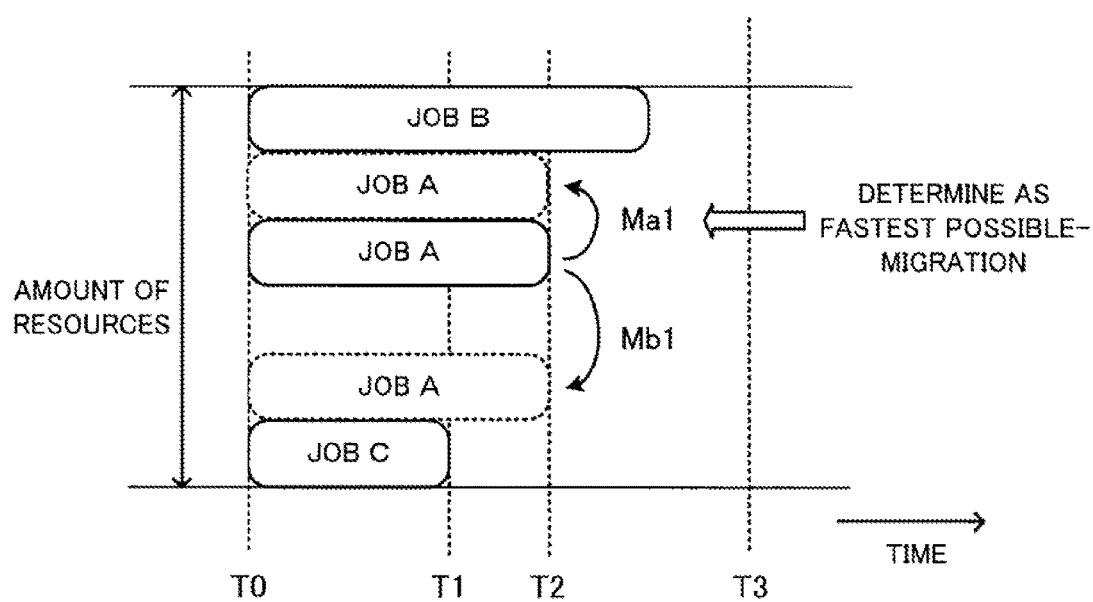
FIG. 12 illustrates an example of a plurality of possible migrations.
Figure 13:
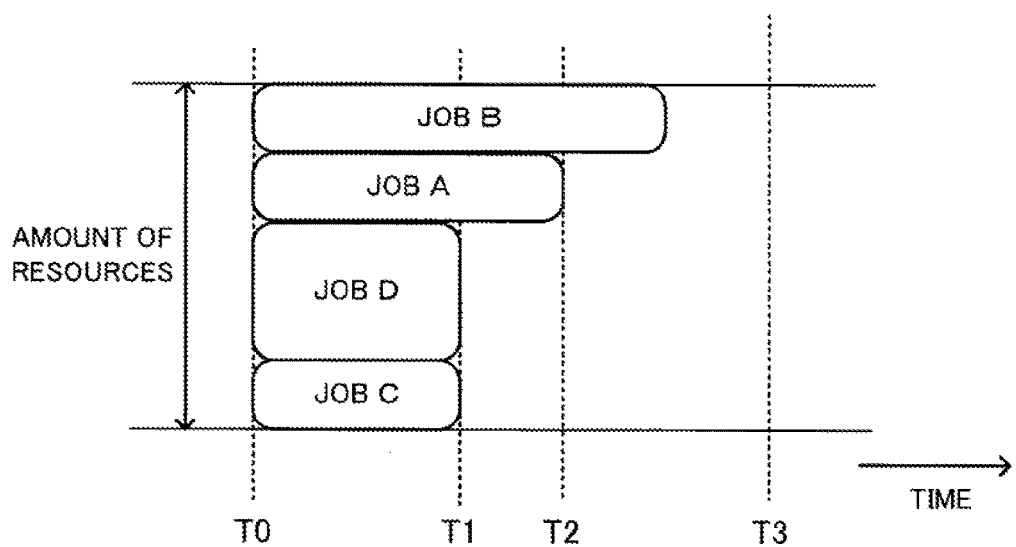
FIG. 13 illustrates an example of executing jobs after a migration.

The following describes a flow from the determination and judgment of a fastest possible-migration to the assignment of jobs after a migration, with reference to FIGS. 11 to 13.

FIG. 11 illustrates an example of submitting a job in a fragmented state. In the example of FIG. 11, jobs A, B, and C respectively assigned to nodes start to execute at the current time T0. In addition, free nodes, to which the jobs A, B, and C are not assigned, are scattered, thereby causing a fragmented state.

A job D is submitted to a system where the jobs A, B, and C are under execution. If the current state continues, the start time for the job D is time T1, and it is not possible to start to execute the job D immediately at the current time T0. Therefore, the job controller 10 carries out an evaluation to determine whether a migration improves the operating rate or not.

FIG. 12 illustrates an example of a plurality of possible migrations. It is assumed that a migration of the job A to a free node n1 is taken as a possible migration Ma1, and a migration of the job A to a free node n2 is taken as a possible migration Mb1.

The job controller 10 calculates a coefficient for an amount of communication on the basis of the amount of communication needed to migrate the job A in the possible migration Ma1 and the amount of communication needed to migrate the job A in the possible migration Mb1, and then carries out an evaluation.

In this example, assuming that the possible migration Ma1 needs a much smaller amount of communication than the possible migration Mb1, the job controller 10 determines the possible migration Ma1 as a fastest possible-migration.

FIG. 13 illustrates an example of executing jobs after a migration. The job controller 10 determines whether the determined possible migration Ma1 improves the operating rate or not. In this example, it is assumed that the migration of the job A in the possible migration Ma1 takes a shorter time than the case of starting to execute the job D at time T1, and therefore the migration is determined to improve the operating rate.

Therefore, the job controller 10 performs the possible migration Ma1 to migrate the job A, and assigns the job D to a node that has become free as a result of the possible migration Ma1, and executes the job D.

Heretofore, the embodiments have been exemplified. In this connection, the components described in the embodiments may be replaced with other components having equivalent functions or other components or processing operations may be added. In addition, desired two or more configurations (features) in the embodiments may be combined.

According to one aspect, it is possible to improve an operating rate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a processor configured to perform a procedure including:
taking currently executing jobs respectively as candidate jobs, and specifying, when a migration of a candidate job to a migration destination node selected from free nodes, which are not executing any jobs, is expected to expand a continued range of free nodes, the migration of the candidate job to the migration destination node as a possible migration;
determining, when a plurality of possible migrations is specified, a possible migration to be performed from among the plurality of possible migrations, based on amounts of communication needed to perform individual migrations indicated by the plurality of possible migrations and numbers of nodes used for executing candidate jobs to be migrated in the individual migrations; and
performing the determined possible migration,
the determining of the possible migration to be performed includes:
repeatedly extracting, as a pair of possible migrations, two possible migrations that have not been excluded from comparisons, from among the plurality of possible migrations;

calculating a first amount of communication needed to perform a first migration indicated by a first possible migration included in the pair of possible migrations, and a second amount of communication needed to perform a second migration indicated by a second possible migration included in the pair of possible migrations;

calculating a first number of nodes used for executing a first candidate job to be migrated in the first migration, and a second number of nodes used for executing a second candidate job to be migrated in the second migration;

calculating, as a first evaluation value, an amount of communication by dividing the second amount of communication by the first amount of communication;

calculating, as a second evaluation value, a sum of values for the amount of communication and the number of nodes being calculated by dividing the second number of nodes by the first number of nodes; and carrying out a first evaluation using the first evaluation value to make a determination on which of the possible migrations included in the pair takes a shorter time for the job migration than another of the possible migrations included in the pair, and carrying out, if the first evaluation value is within a prescribed range, a second evaluation using the second evaluation value to determine which of the possible migrations included in the pair takes a shorter time for the job migration than another of the possible migrations included in the pair.

2. The information processing apparatus according to claim 1, wherein the procedure further includes calculating each of the amounts of communication, based on a number of communication hops between a node currently executing a candidate job to be migrated in a corresponding one of the individual migrations and a migration destination node for the candidate job to be migrated in the corresponding migration and an amount of memory used by the candidate job to be migrated in the corresponding migration.

3. The information processing apparatus according to claim 1, wherein the procedure further includes:

calculating a reduced operating rate and an improved operating rate that result from a migration indicated by the possible migration to be performed, the reduced operating rate indicating how much an execution efficiency of a candidate job to be migrated is decreased, the improved operating rate indicating how much an execution efficiency of jobs other than the candidate job to be migrated is increased; and determining, when the reduced operating rate is smaller than the improved operating rate, that execution of the migration indicated by the possible migration to be performed is effective.

4. A job management method comprising:

taking, by an information processing apparatus for managing jobs to be executed by a plurality of nodes connected over a direct network, currently executing jobs respectively as candidate jobs, and specifying, when a migration of a candidate job to a migration destination node selected from free nodes, which are not executing any jobs, is expected to expand a continued range of free nodes, the migration of the candidate job to the migration destination node as a possible migration;

determining, by the information processing apparatus, when a plurality of possible migrations is specified, a possible migration to be performed from among the plurality of possible migrations, based on amounts of communication needed to perform individual migrations indicated by the plurality of possible migrations and numbers of nodes used for executing candidate jobs to be migrated in the individual migrations; and performing the determined possible migration, the determining of the possible migration to be performed includes:

repeatedly extracting, by the information processing apparatus, as a pair of possible migrations, two possible migrations that have not been excluded from comparisons, from among the plurality of possible migrations;

calculating, by the information processing apparatus, a first amount of communication needed to perform a first migration indicated by a first possible migration included in the pair of possible migrations, and a second amount of communication needed to perform a second migration indicated by a second possible migration included in the pair of possible migrations;

calculating, by the information processing apparatus, a first number of nodes used for executing a first candidate job to be migrated in the first migration, and a second number of nodes used for executing a second candidate job to be migrated in the second migration;

calculating, by the information processing apparatus, as the first evaluation value, an amount of communication by dividing the second amount of communication by the first amount of communication;

calculating, by the information processing apparatus, as the second evaluation value, a sum of values for the amount of communication and the number of nodes being calculated by dividing the second number of nodes by the first number of nodes; and carrying out, by the information processing apparatus, a first evaluation using the first evaluation value to make a determination on which of the possible migrations included in the pair takes a shorter time for the job migration than another of the possible migrations included in the pair, and carrying out, if the first evaluation value is within the prescribed range, a second evaluation using the second evaluation value to determine which of the possible migrations included in the pair takes a shorter time for the job migration than another of the possible migrations included in the pair.

5. A non-transitory computer-readable recording medium storing a job management program that causes an information processing apparatus to perform a procedure including:

taking currently executing jobs respectively as candidate jobs, and specifying, when a migration of a candidate job to a migration destination node selected from free nodes, which are not executing any jobs, is expected to expand a continued range of free nodes, the migration of the candidate job to the migration destination node as a possible migration;

determining, when a plurality of possible migrations is specified, a possible migration to be performed from among the plurality of possible migrations, based on amounts of communication needed to perform individual migrations indicated by the plurality of possible migrations and numbers of nodes used for executing candidate jobs to be migrated in the individual migrations; and performing the determined possible migration, the determining of the possible migration to be performed includes:

repeatedly extracting, as a pair of possible migrations, two possible migrations that have not been excluded from comparisons, from among the plurality of possible migrations;

calculating a first amount of communication needed to perform a first migration indicated by a first possible migration included in the pair of possible migrations, and a second amount of communication needed to perform a second migration indicated by a second possible migration included in the pair of possible migrations;

calculating a first number of nodes used for executing a first candidate job to be migrated in the first migration, and a second number of nodes used for executing a second candidate job to be migrated in the second migration;

calculating, as the first evaluation value, an amount of communication by dividing the second amount of communication by the first amount of communication;

calculating, as the second evaluation value, a sum of values for the amount of communication and the number of nodes being calculated by dividing the second number of nodes by the first number of nodes; and carrying out a first evaluation using the first evaluation value to make a determination on which of the possible migrations included in the pair takes a shorter time for the job migration than another of the possible migrations included in the pair, and carrying out, if the first evaluation value is within the prescribed range, a second evaluation using the second evaluation value to determine which of the possible migrations included in the pair takes a shorter time for the job migration than another of the possible migrations included in the pair.

* * * * *